United States Patent
Altshul et al.

(10) Patent No.: US 12,238,624 B2
(45) Date of Patent: Feb. 25, 2025

(54) WIRELESS CONNECTION ESTABLISHMENT BETWEEN PERIPHERAL DEVICE AND MULTIPLE CENTRAL DEVICES

(71) Applicant: TEXAS INSTRUMENTS INCORPORATED, Dallas, TX (US)

(72) Inventors: Maxim Altshul, Hod Hasharon (IL); Yaron Alpert, Hod Hasharon (IL); Lior Gersi, Kfar Saba (IL); Yaniv Weizman, Tel Aviv Jaffa (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 447 days.

(21) Appl. No.: 17/324,317

(22) Filed: May 19, 2021

(65) Prior Publication Data

US 2022/0377517 A1    Nov. 24, 2022

(51) Int. Cl.
*H04W 4/80* (2018.01)
*H04W 76/11* (2018.01)
*H04W 76/40* (2018.01)

(52) U.S. Cl.
CPC .............. *H04W 4/80* (2018.02); *H04W 76/11* (2018.02); *H04W 76/40* (2018.02)

(58) Field of Classification Search
CPC ........ H04W 4/80; H04W 76/11; H04W 76/40
See application file for complete search history.

(56) References Cited

U.S. PATENT DOCUMENTS

| 2003/0045242 | A1* | 3/2003 | Cho | H04W 16/14 455/67.11 |
| 2010/0317289 | A1* | 12/2010 | Desai | H04B 17/318 455/41.2 |
| 2011/0021142 | A1* | 1/2011 | Desai | H04W 4/80 455/41.2 |
| 2014/0064212 | A1* | 3/2014 | Ko | H04L 1/0083 370/329 |
| 2014/0086125 | A1* | 3/2014 | Polo | H04W 52/0229 370/311 |
| 2015/0161061 | A1* | 6/2015 | Couch | G06F 1/3231 710/3 |
| 2015/0304424 | A1* | 10/2015 | Lee | H04W 72/04 709/208 |
| 2015/0304803 | A1* | 10/2015 | Chen | H04W 52/0209 455/41.2 |
| 2018/0242130 | A1* | 8/2018 | Ganton | H04W 76/00 |
| 2021/0119716 | A1* | 4/2021 | Yang | H04L 7/0012 |
| 2022/0221924 | A1* | 7/2022 | Riviello | G06F 1/329 |
| 2022/0304078 | A1* | 9/2022 | Xu | H04R 1/1016 |

\* cited by examiner

*Primary Examiner* — Benjamin H Elliott, IV
*Assistant Examiner* — Yewon Kim
(74) *Attorney, Agent, or Firm* — Mandy Barsilai Fernandez; Frank D. Cimino

(57) ABSTRACT

A method includes receiving, by a peripheral device, a first connection request from a first central device; providing, by the peripheral device, a first indication of an anchor point time to the first central device before establishing a first wireless connection with the first central device; and responding, by the peripheral device, to the first connection request and establishing the first wireless connection using a first anchor point based on the first indication.

22 Claims, 6 Drawing Sheets

WIRELESS CONNECTION ESTABLISHMENT BETWEEN PERIPHERAL DEVICE AND MULTIPLE CENTRAL DEVICES

SUMMARY

In accordance with at least one example of the disclosure, a method includes receiving, by a peripheral device, a first connection request from a first central device; providing, by the peripheral device, a first indication of an anchor point time to the first central device before establishing a first wireless connection with the first central device; and responding, by the peripheral device, to the first connection request and establishing the first wireless connection using a first anchor point based on the first indication.

In accordance with another example of the disclosure, a device includes a wireless transceiver, a processor coupled to the wireless transceiver, and a memory coupled to the processor. The memory stores instructions that, when executed by the processor, cause the device to be configured to receive a first connection request from a first central device, provide a first indication of an anchor point time to the first central device before establishing a first wireless connection with the first central device, and respond to the first connection request and establish the first wireless connection using a first anchor point based on the first indication.

In accordance with yet another example of the disclosure, a system includes a first device configured as a Bluetooth Low Energy (BLE) peripheral, and a second device configured as a BLE central. The first device is configured to receive a first connection request from the second device, provide a first indication of an anchor point time to the second device before establishing a first wireless connection with the second device, and respond to the first connection request and establish the first wireless connection using a first anchor point based on the first indication.

BRIEF DESCRIPTION OF THE DRAWINGS

For a detailed description of various examples, reference will now be made to the accompanying drawings in which.

DETAILED DESCRIPTION

Figure 1:
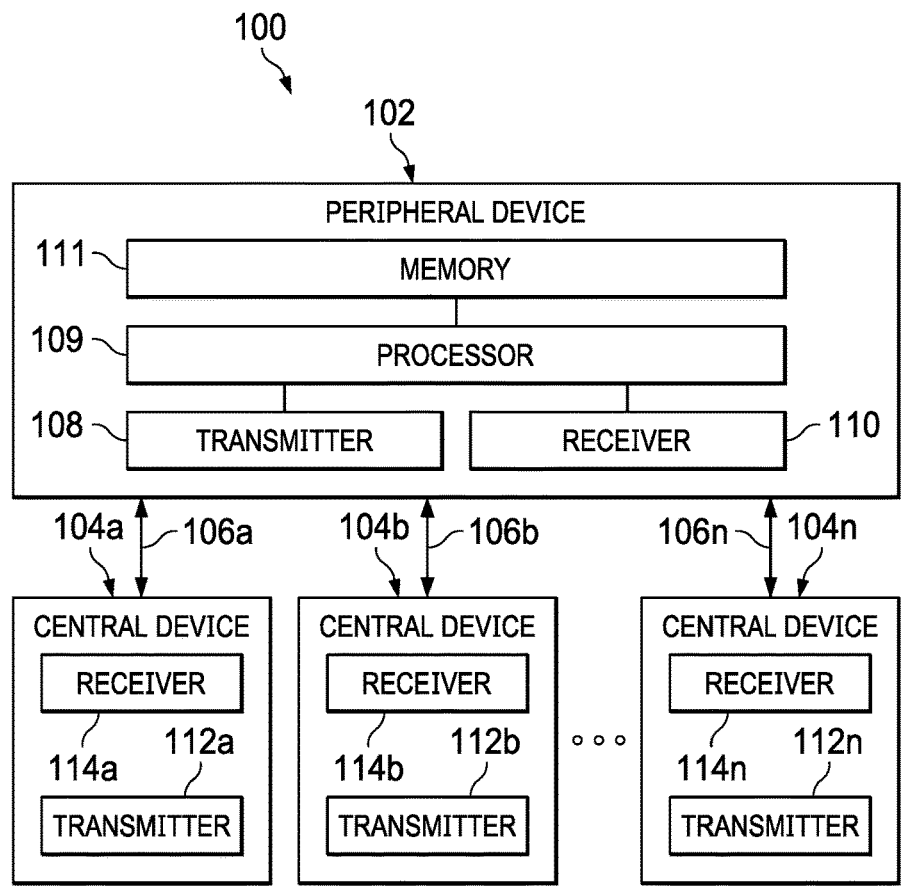
FIG. 1 is a block diagram of a system for wireless communication between a peripheral device and multiple central devices in accordance with various examples.

Bluetooth (BT) and Bluetooth Low Energy (BLE) are examples of communication protocol standards that facilitate wireless data transmission over a radio link. Various applications include a BLE master or central device (a "central") that maintains wireless communication links with multiple BLE slave or peripheral devices (each a "peripheral"). One such application is a vehicular access application, in which the vehicle is the BLE central and mobile devices of an access group (e.g., approved or authenticated users' smartphones) are the multiple BLE peripherals.

In some cases, a central device initiates the establishment of a connection with a peripheral device by sending a connection request to the peripheral device. The peripheral device responds to the connection request, and a connection between the central device and the peripheral device is established after completion of a connection establishment procedure/exchange. Thus, the central device acts as a connection initiator or requester, while the peripheral device acts as a connection responder. After the connection is established, communication can occur between the devices, such as by exchanging data packets over a wireless communication link or a wireless connection formed between the devices.

In the particular example in which the BLE communication protocol is utilized, a BLE state machine includes states for the BLE devices (e.g., candidate peripheral and candidate central devices). The states include an unassigned/standby state, a discovery state, a connecting state, and a connected state. In this example, the connection between a peripheral device and a central device is established when the devices are in the connected state. However, the connection between devices is not established when the devices are in any of the unassigned/standby state, the discovery state, or the connecting state.

In some cases, a central device manages wireless communication links with multiple peripheral devices by establishing an "anchor point" for each peripheral. An anchor point for a particular peripheral refers to an example of an agreed-upon point in time at which a communication between the BLE central and the particular BLE peripheral will occur, and subsequent communications occur periodically thereafter based on that anchor point.

For example, during a connection establishment period between a central device and a peripheral device, the central chooses and specifies to the peripheral a reference point in time, which is the anchor point. A service cycle is specified with reference to the anchor point. The service cycle specification includes a service period and a service interval. The service period is the time period during which the central and peripheral communicate. The service interval is the amount of time between service periods as well as the amount of time between the anchor point and the first service period. Thus, the anchor point (in conjunction with the service interval) specifies the beginning of the service periods during which the peripheral listens for transmissions from the central.

Communication collisions can occur when a central receives communications from multiple peripherals simultaneously or near enough in time to degrade overall communications performance. Such communication collisions are avoided by synchronizing anchor points for the multiple peripherals, such as by providing sufficient duration between anchor points for different peripherals.

For example, a central establishes wireless communication links with first and second peripherals. The central establishes a first anchor point at time=0 ms to begin communicating with the first peripheral and a second anchor point at time=1 ms to begin communicating with the second peripheral. Subsequent communications between the central and the first and second peripherals occur periodically, such as 5 ms from their respective anchor point or from a previous (e.g., most recent) communication. Accordingly, communication collisions between the central and the first and second peripherals are avoided.

However, in some cases, device manufacturers (e.g., smartphone manufacturers) prefer or even require their devices or smartphones not to be BLE peripherals, such as to address or mitigate coexistence and air access coordination issues with other wireless technologies used by the smartphone or device. In these cases, the smartphone or other device should function as a BLE central instead. Continuing the above vehicular application example, this necessitates the vehicle be the BLE peripheral in the vehicle-smartphone (or other user device) connection, which creates a multi-central situation where multiple BLE centrals (e.g., the smartphones in the access group) are establishing wireless communication links or connections with a single BLE peripheral (e.g., the vehicle). The BLE specification does not provide a way for the multiple BLE centrals to coordinate the placement of anchor points with the BLE peripheral sufficient to avoid collisions. The BLE specification also does not provide a way for a BLE peripheral to influence the placement of an anchor point before a connection with a BLE central is established.

Examples of this description address the foregoing by allowing a BLE peripheral to influence the placement of anchor points with each of multiple BLE centrals before a connection is established (e.g., before or during the connection establishment procedure/exchange, and/or before the devices transition to the BLE connected state) with each of the BLE centrals. For example, the BLE peripheral is configured to provide indications of one or more anchor point times or preferences to multiple potential BLE centrals. In some examples, the indications of anchor point times include preferences and/or limitations such as available anchor point times, unavailable anchor point times (e.g., times that are too close to other, already-taken anchor point or service period times), a minimum tolerable amount of time between an already-taken anchor point or service period time and a potential new anchor point time, and the like. The BLE peripheral provides the indications of anchor point times or preferences to the BLE centrals before or during the establishment of wireless communications links (e.g., a connection as described above) with those centrals. In some examples, communication occurs between the BLE peripheral and a BLE central to negotiate or agree upon an anchor point, but this negotiation occurs outside of (e.g., before) the establishment of a connection as described above. In examples of this description, anchor points between a peripheral and central may be coordinated and agreed upon in various ways, including advertising, fast signaling, preconfigured parameters, or pre-connection establishment with a proxy device. These examples are described below with reference to the accompanying figures.

FIG. 1 is a block diagram of a system 100 for wireless communication between a peripheral device and multiple central devices in accordance with examples of this description. In particular, the system 100 includes a peripheral device 102 and any number of candidate central devices 104a, 104b, 104n, which are collectively referred to as central devices 104. As described above, in some examples, the peripheral device 102 is a BLE peripheral device 102 and the central devices 104 are BLE central devices 104.

In the example of FIG. 1, the BLE peripheral device 102 is configured to wirelessly communicate with one or more BLE central devices 104 using various wireless communication links. For example, the BLE peripheral device 102 is configured to wirelessly communicate with the BLE central device 104a using a first wireless communication link 106a. Continuing this example, the BLE peripheral device 102 is configured to wirelessly communicate with the BLE central device 104b and the BLE central device 104n using second and third wireless communication links 106b, 106n, respectively. The wireless communication links 106a, 106b, 106n are collectively referred to as wireless communication links 106.

In an example, the BLE peripheral device 102 includes a transmitter 108 and a receiver 110. In FIG. 1, the transmitter 108 and the receiver 110 are shown separately for clarity; however, the functionality of the transmitter 108 and the receiver 110 may be provided by a single functional block (e.g., as a wireless transceiver of the BLE peripheral device 102). The BLE peripheral device 102 also includes a processor 109 coupled to a memory 111. The processor 109 is also coupled to the transmitter 108 and the receiver 110 (or wireless transceiver) to facilitate communication with other devices, such as the BLE central devices 104. The memory 111 is configured to store instructions that, when executed by the processor 109, cause the processor 109 (or the BLE peripheral device 102) to be configured to perform the various functionality described herein. The memory 111 is one example of a non-transitory, computer-readable medium.

Similarly, the BLE central devices 104 each include a transmitter 112 (e.g., the BLE central device 104a includes transmitter 112a, the BLE central device 104b includes transmitter 112b, and the BLE central device 104n includes transmitter 112n) and a receiver 114 (e.g., the BLE central device 104a includes receiver 114a, the BLE central device 104b includes receiver 114b, and the BLE central device 104n includes receiver 114n). The transmitters 112a, 112b, 112n are collectively referred to as transmitters 112, and the receivers 114a, 114b, 114n are collectively referred to as receivers 114. As above, the transmitters 112 and receivers 114 are shown separately for clarity; however, the functionality of the transmitters 112 and receivers 114 may be provided by a single functional block in each of the BLE central devices 104 (e.g., as a wireless transceiver of each of the BLE central devices 104). Although not shown in FIG. 1, the BLE central devices 104 also include processors and memories, such as the processor 109 and the memory 111 described above with respect to the BLE peripheral device 102.

In an example, the BLE peripheral device 102 is configured to send data (e.g., to one or more of the BLE central devices 104) over the wireless communication links 106 using the transmitter 108. The BLE peripheral device 102 is also configured to receive data (e.g., from one or more of the BLE central devices 104) over the wireless communication links 106 using the receiver 110. Similarly, the BLE central devices 104 are configured to send data (e.g., to the BLE peripheral device 102) over the respective wireless communication links 106 using their respective transmitter 112. The BLE central devices 104 are also configured to receive data (e.g., from the BLE peripheral device 102) over the respective wireless communication links 106 using their respective receiver 114.

Figure 2:
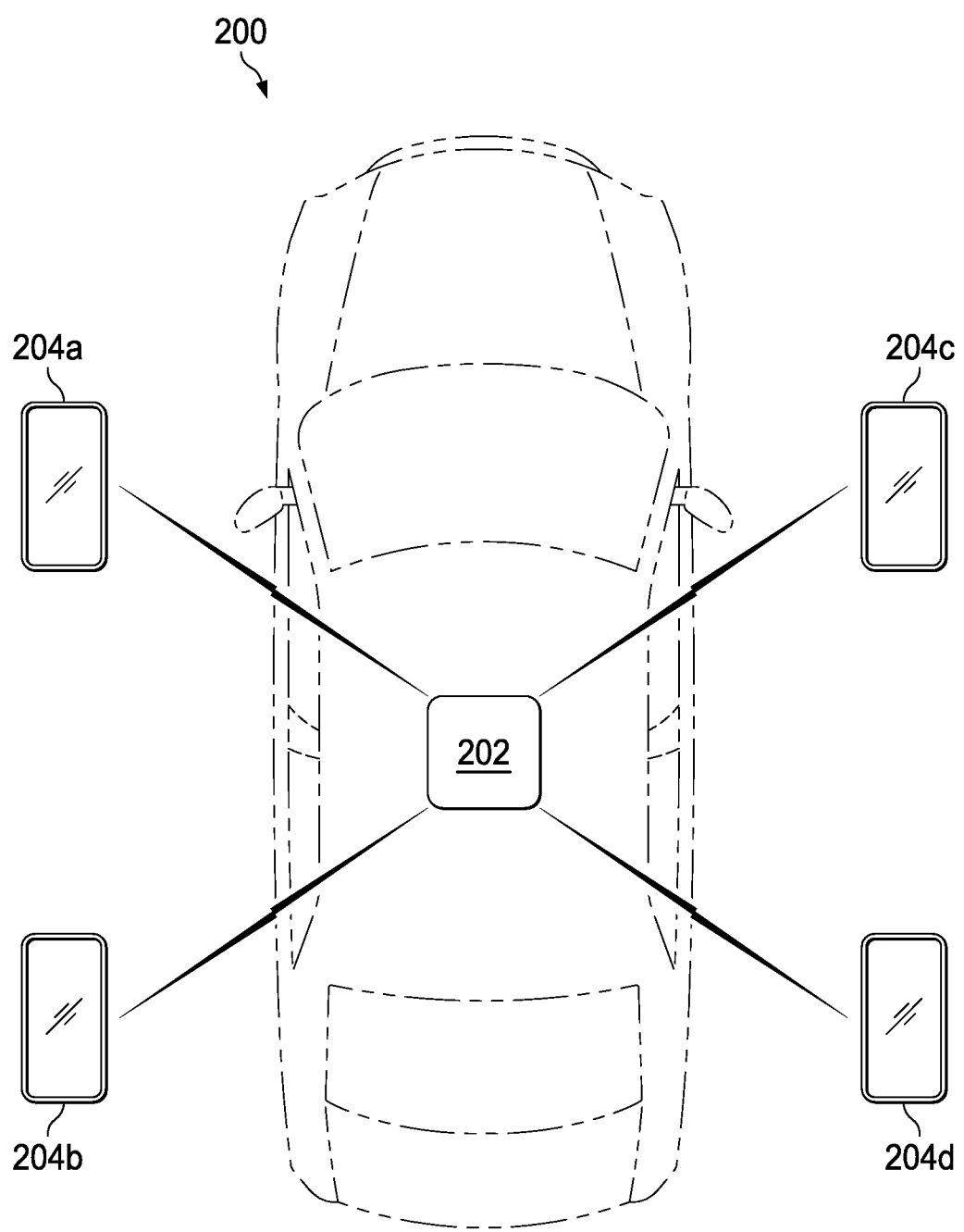
FIG. 2 is a schematic diagram of a system for wireless communication between a peripheral device and multiple central devices in accordance with various examples.

FIG. 2 is a schematic diagram of another system 200 for wireless communication between a peripheral device and multiple central devices in accordance with examples of this description. The system 200 is similar to the system 100 of FIG. 1, although in the context of a vehicular access application as described above. In some cases, device manufacturers (e.g., smartphone manufacturers) prefer or even require their devices not to be BLE peripherals, such as to address or mitigate coexistence issues with other wireless technologies used by the device. In these cases, the device should function as a BLE central instead. Continuing the above vehicular application example, this necessitates the vehicle be the BLE peripheral in the vehicle-smartphone (or other user device) connection.

Thus, the system 200 includes a vehicle 202 that functions as a BLE peripheral. The system 200 also includes multiple user devices 204a-204d that each function as a BLE central. In the example of FIG. 2, the devices 204a-204d are alternately referred to as smartphones 204a-204d, which belong to approved or authenticated users, and thus form an access group. For example, the smartphones 204a-204d function as vehicle keys for the vehicle 202. When a user possessing a smartphone 204 is within a certain proximity to the vehicle 202, the user is permitted to lock or unlock the vehicle 202, start or stop a motor of the vehicle 202, or otherwise alter a configuration of the vehicle 202. As described above, this can create a multi-central situation in which multiple BLE centrals (e.g., the smartphones 204 in the access group) are establishing wireless communication links or connections with a single BLE peripheral (e.g., the vehicle 202).

Figure 3:
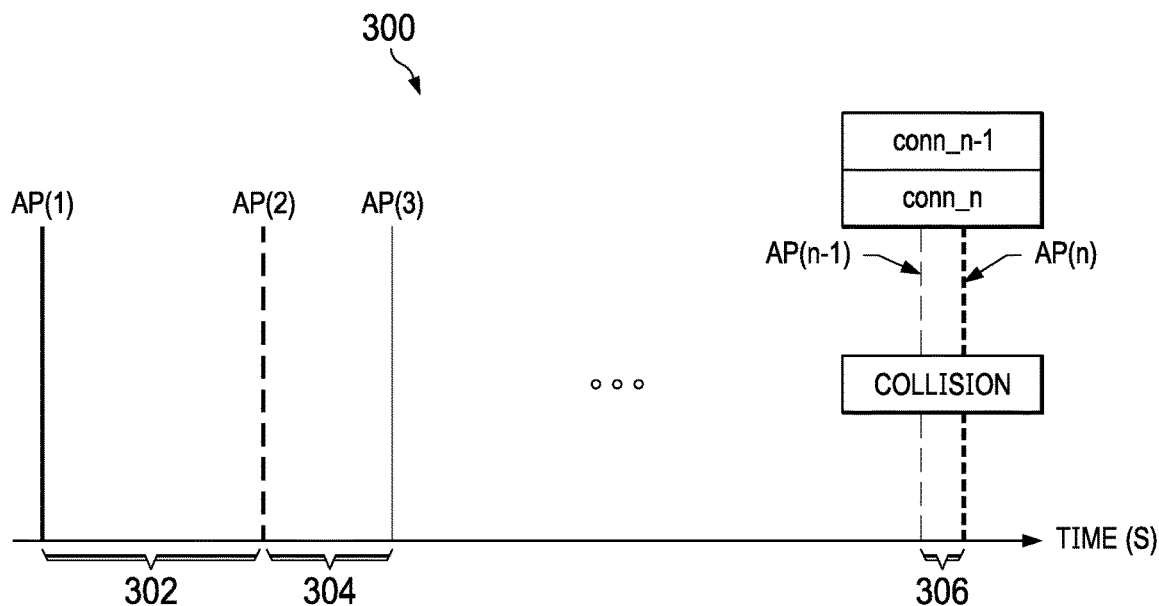
FIG. 3 is a graph of anchor points as a function of time in accordance with various examples.

FIG. 3 is a graph 300 of anchor points as a function of time. The graph 300 shows an example collision between anchor points. As described above, communication collisions occur when a receiving device receives communications from multiple other devices simultaneously or near enough in time to degrade overall communications performance. Referring specifically to the example of FIG. 2, described above, a collision occurs if the vehicle 202, acting as a BLE peripheral, receives sufficiently proximate in time communications from two or more of the devices or smartphones 204, which act as BLE centrals.

The graph 300 includes anchor points AP(1), AP(2), AP(3), . . . , AP(n−1), and AP(n). Each anchor point AP(1)-AP(n) corresponds to a different connection (e.g., between the vehicle 202 as a BLE peripheral and the smartphones 204 as BLE centrals). For example, the anchor point AP(1) is for a first connection between the vehicle 202 and a first smartphone 204a, the anchor point AP(2) is for a second connection between the vehicle 202 and a second smartphone 204b, and so on. In FIG. 3, the labels indicate both the anchor points and the time at which the anchor point occurs. Thus, the anchor point AP(1) occurs at time AP(1), while the anchor point AP(2) occurs at time AP(2), and so on.

In various examples, a minimum amount of time between anchor points (e.g., a minimum threshold) avoids collisions between communications. As described above, a collision occurs when anchor points occur too closely in time, which causes degradation in the communications associated with those anchor points. In one example, the minimum threshold between anchor points is determined based on physical limitations of the wireless link between devices, such as a minimum expected transmission time between devices.

In the example of FIG. 3, an amount of time 302 between the anchor point AP(1) and the anchor point AP(2) is greater than the minimum threshold, and thus no collision occurs. Similarly, an amount of time 304 between the anchor point AP(2) and the anchor point AP(3) is also greater than the minimum threshold, and thus no collision occurs. However, an amount of time 306 between the anchor point AP(n−1) and the anchor point AP(n) is less than the minimum threshold, and thus a collision occurs, which degrades or otherwise inhibits communication between the vehicle 202 and the n−1th smartphone 204 as well as between the vehicle 202 and the nth smartphone/central device 204.

As described above, in some cases, device manufacturers (e.g., smartphone 204 manufacturers) prefer or even require their smartphones not to be BLE peripherals, and thus the smartphone 204 should function as a BLE central. Continuing the above vehicular application example of FIG. 2, this necessitates the vehicle 202 be the BLE peripheral in the vehicle-smartphone connection, which creates a multi-central situation where multiple BLE centrals (e.g., the smartphones 204 in the access group) are establishing wireless communication links or connections with a single BLE peripheral (e.g., the vehicle 202). The BLE specification does not provide a way for the BLE peripheral (e.g., the vehicle 202) to influence the placement of anchor points for connections with the multiple BLE centrals (e.g., the smartphones 204), which increases the likelihood of collisions in the multi-central example such as that shown and described above with respect to FIG. 2.

Figure 4:
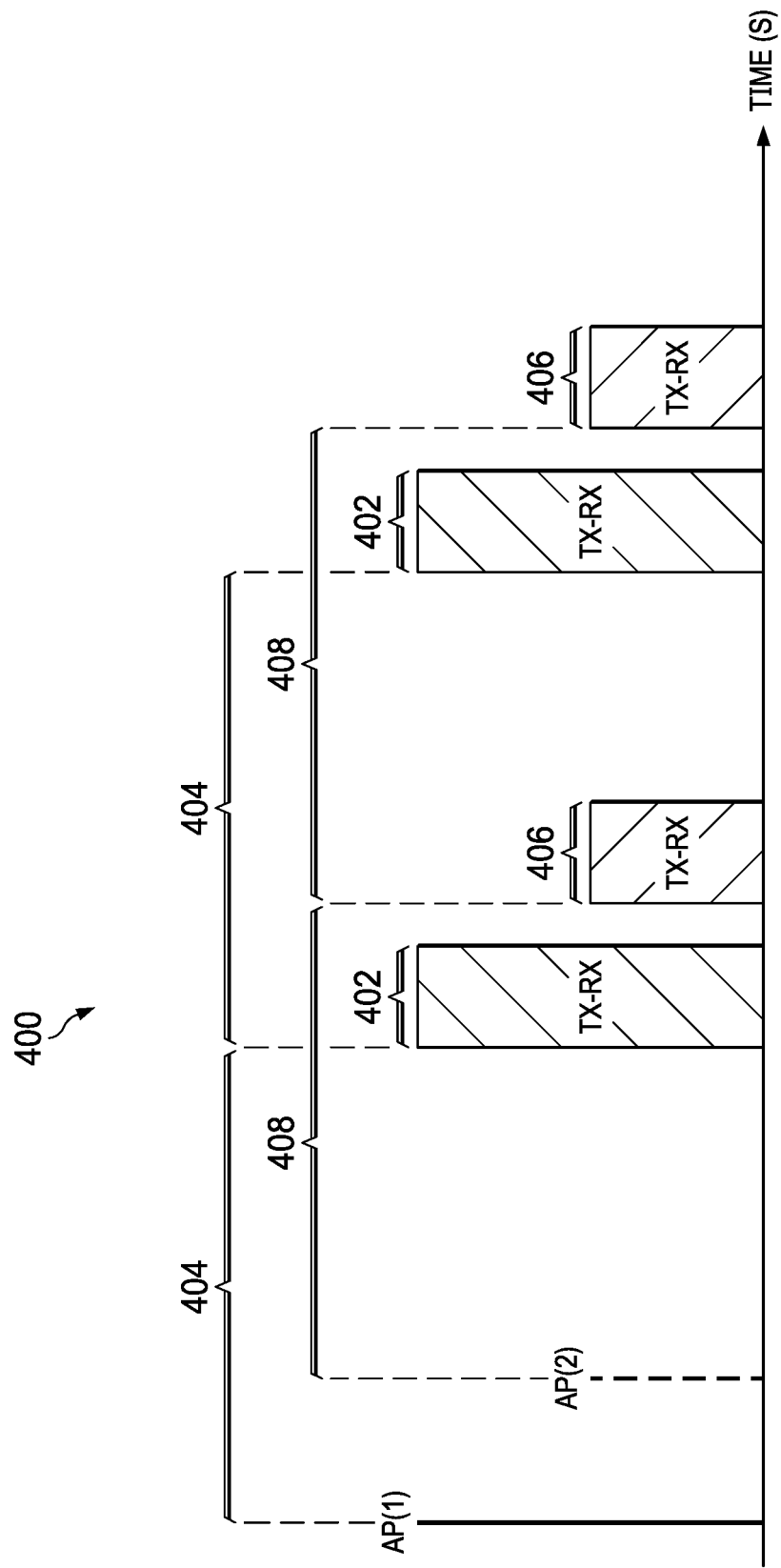
FIG. 4 is a graph of service cycles for two connections as a function of time in accordance with various examples.

FIG. 4 is a graph 400 of service cycles for two connections as a function of time. In particular, the graph 400 includes a first anchor point AP(1) for a first connection (e.g., between the vehicle 202 as a BLE peripheral and a first smartphone 204a as a BLE central). A first service cycle for the first connection is specified with reference to the anchor point AP(1). The graph 400 also includes a second anchor point AP(2) for a second connection (e.g., between the vehicle 202 as a BLE peripheral and a second smartphone 204b as a BLE central). A second service cycle for the second connection is specified with reference to the anchor point AP(2).

As described above, each service cycle specification includes a service period and a service interval. The first service cycle includes first service periods 402, which are the time periods during which the vehicle 202 and the first smartphone 204a communicate. The first service cycle also includes first service intervals 404, which are the amount of time between the first service periods 402 as well as the amount of time between the anchor point AP(1) and the initial first service period 402. The second service cycle includes second service periods 406, which are the time periods during which the vehicle 202 and the second smartphone 204b communicate. The second service cycle also includes second service intervals 408, which are the amount of time between the second service periods 406 as well as the amount of time between the anchor point AP(2) and the initial second service period 406.

Thus, the anchor point AP(1), in conjunction with the first service interval 404 specifies the beginning of the first service periods 402 during which the vehicle 202 listens for transmissions from the first smartphone 204a. Similarly, the anchor point AP(2), in conjunction with the second service interval 408 specifies the beginning of the second service periods 406 during which the vehicle 202 listens for transmissions from the second smartphone 204b.

Figure 5:
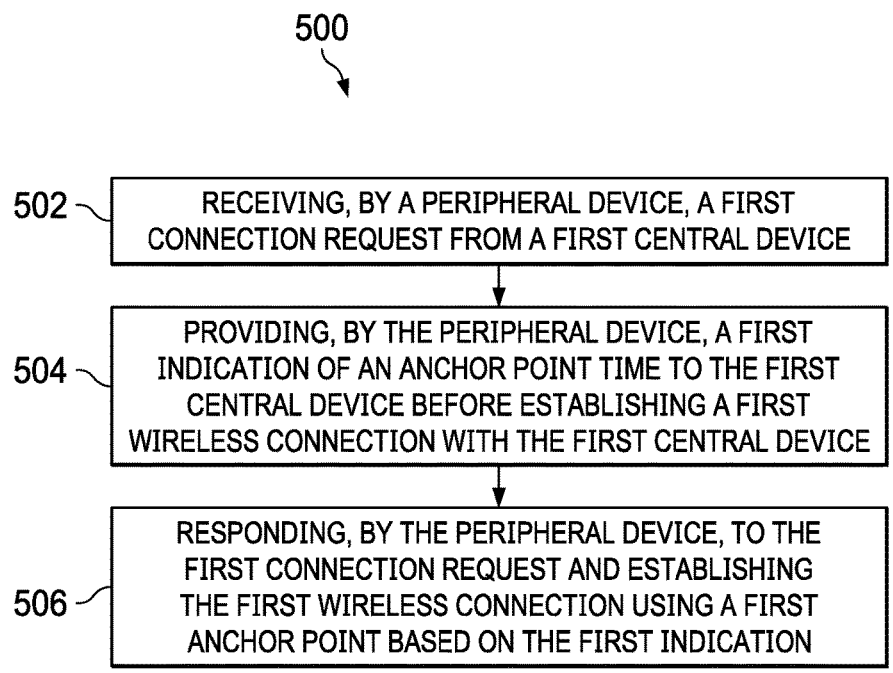
FIG. 5 is a flow chart of a method for wireless communication between a peripheral device and multiple central devices in accordance with various examples.

FIG. 5 is a flow chart of a method 500 in accordance with examples of this description. In the method 500, a peripheral device 102, such as the vehicle 202 (e.g., acting as a BLE peripheral), influences the placement of anchor points with each of multiple central devices 104, such as the smartphones 204 (e.g., acting as BLE centrals). In particular, the peripheral device 102 provides indications of anchor point times (e.g., preferences) to multiple central devices 104 before a connection is established (e.g., before or during the connection establishment procedure/exchange, and/or before the devices transition to the BLE connected state) with each of those central devices 104. As described above, the indications of anchor point times include preferences and/or limitations such as available anchor point times, unavailable anchor point times (e.g., times that are too close to other, already-taken anchor point or service period times), a minimum tolerable amount of time between an already-taken anchor point or service period time and a potential new anchor point time, and the like. As described further below, a peripheral device 102 is configured to influence the placement of anchor points with each of multiple central devices 104 before a connection is established with those central devices 104. The peripheral device 102 influences the placement of anchor points in various ways, including advertising, fast signaling, preconfigured parameters, or pre-connection establishment with a proxy device.

In some examples, the steps of the method 500 occur in the order shown in FIG. 5. However, in other examples, certain of the steps of the method 500 occur in an order other than that shown in FIG. 5, including cases in which some steps (or portions thereof) of the method 500 occur in parallel.

Regardless of the particular ordering of the steps in the method 500, in FIG. 5 the method 500 begins in block 502 with receiving, by the peripheral device 102, a first connection request from a central device 104. The method 500 continues in block 504 with providing, by the peripheral device 102, an indication of an anchor point time to the central device 104. As described above, the indication of the anchor point time is provided before a wireless connection is established with the central device 104. In one example, the indication of the anchor point time is provided by the peripheral device 102 before the connection request is received from a central device 104 in block 502. In another example, the indication of the anchor point time is provided by the peripheral device 102 after the connection request is received from a central device 104 in block 502, but before a connection is established with the central device 104 (e.g., before the peripheral device 102 and the central device 104 transition to the BLE connected state). Regardless of when the peripheral device 102 provides the indication of the anchor point time to the central device 104, the peripheral device 102 is thus able to influence the placement of anchor points with the central device 104 before the wireless connection is established with the central device 104.

In some examples, the indications of anchor point times include preferences and/or limitations such as available anchor point times, unavailable anchor point times (e.g., times that are too close to other, already-taken anchor point or service period times), a minimum tolerable amount of time between an already-taken anchor point or service period time and a potential new anchor point time, and the like.

The method 500 continues in block 506 with responding, by the peripheral device 102, to the connection request and establishing the wireless connection with the central device 104. The connection between the central device 104 and the peripheral device 102 is established after completion of a connection establishment procedure/exchange, such as when the peripheral device 102 and the central device 104 transition to the BLE connected state. Thus, the central device 104 acts as a connection initiator or requester, while the peripheral device 102 acts as a connection responder. After the connection is established, communication can occur between the peripheral device 102 and the central device 104, such as by exchanging data packets over a wireless communication link or a wireless connection formed between the peripheral device 102 and the central device 104.

The wireless connection with the central device 104 is established using an anchor point that is based on the indication provided by the peripheral device 102. In one example, the indication of the anchor point time includes one or more available anchor point times, and the connection with the central device 104 is established using an anchor point selected from the available anchor point times. In another example, the indication of the anchor point time includes one or more unavailable anchor point times, and the connection with the central device 104 is established using an anchor point at a time other than the unavailable anchor point times. In yet another example, the indication of the anchor point time includes a minimum tolerable amount of time between anchor points, and one or more already-taken anchor points, and the connection with the central device 104 is established using an anchor point that is separated from the already-taken anchor points by at least the minimum tolerable amount of time. Regardless of how the anchor point is determined, the peripheral device 102 thus influences the placement of anchor points with the central device 104 before the wireless connection is established with the central device 104.

Figure 6:
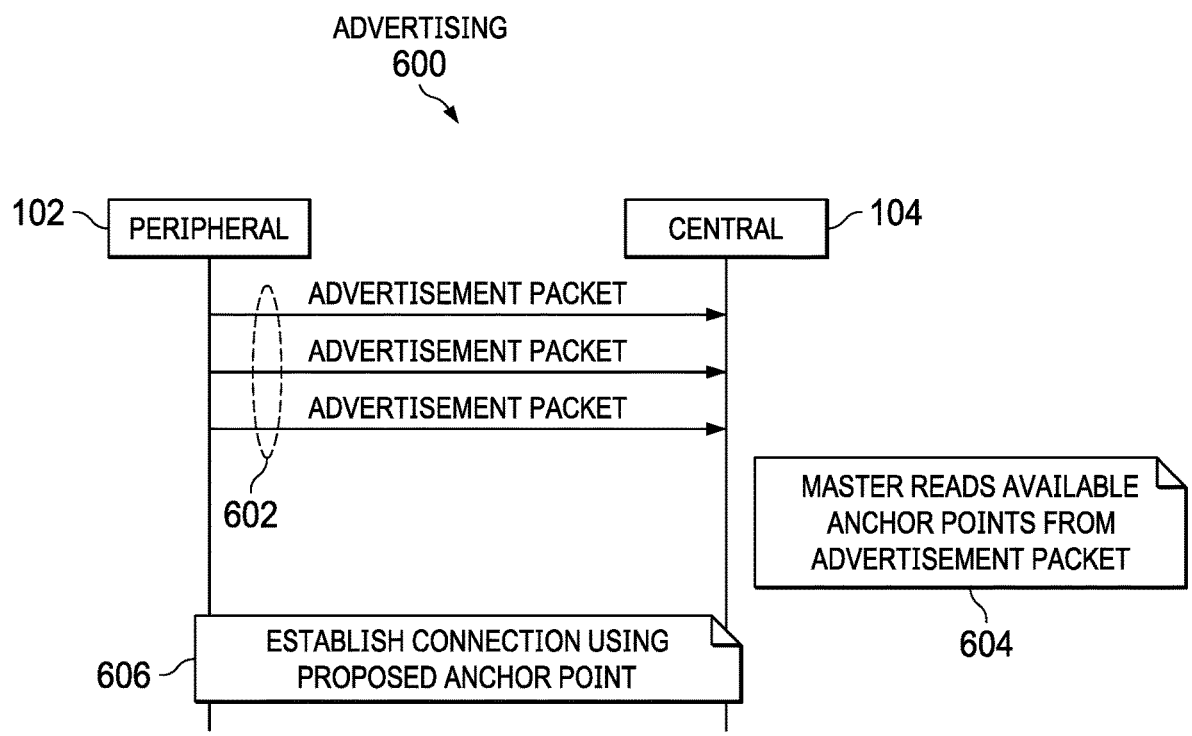
FIG. 6 is a timing diagram of an advertising example of communications between a peripheral device and a central device in accordance with various examples.

FIG. 6 is a timing diagram 600 of communications between a peripheral device 102 and a central device 104 in accordance with examples of this description. The timing diagram 600 is an advertising example, in which the peripheral device 102 provides the indication of the anchor point time to the central device 104 using an advertising procedure. The timing diagram 600 is an example of the peripheral device 102 influencing the placement of an anchor point with a central device 104 before a connection establishment procedure/exchange.

In the timing diagram 600, at time 602, the peripheral device 102 broadcasts one or more advertisement packets, which are received by the central device 104. In some examples, the peripheral device 102 broadcasts an advertisement packet periodically, irrespective of whether the peripheral device 102 receives a connection request from any central device 104. The advertisement packet(s) broadcast by the peripheral device 102 include the indication of the anchor point time, such as available anchor point times, unavailable anchor point times, a minimum tolerable amount of time between an already-taken anchor point or service period time and a potential new anchor point time, and the like.

At time 604, the central device 104 receives one of the advertisement packets from the peripheral device 102 and determines an available anchor point based on the indication of the anchor point time included in the advertisement packet.

At time 606, the central device 104 provides the connection request to the peripheral device 102 to begin the connection establishment procedure/exchange with the peripheral device 102. In the advertising example, the connection request specifies the anchor point. Because the anchor point is already selected from available anchor point time(s) indicated by the advertisement packet, additional negotiation is avoided, and the wireless connection between the peripheral device 102 and the central device 104 is established using the anchor point specified by the connection request. The peripheral device 102 and the central device 104 can then periodically communicate using the established wireless connection and the anchor point specified by the connection request.

Figure 7:
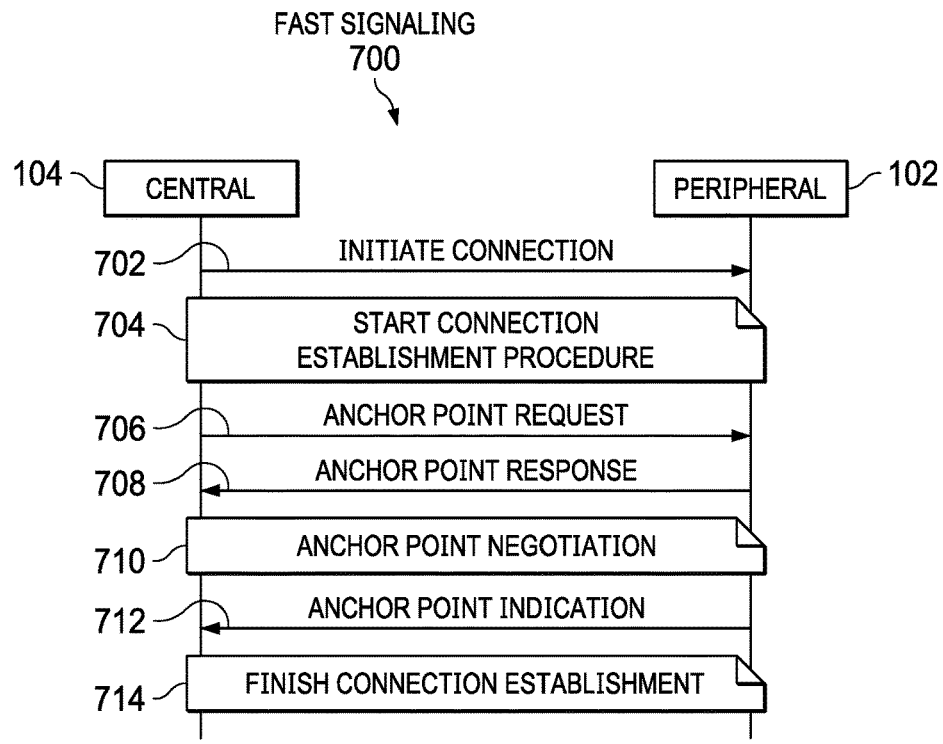
FIG. 7 is a timing diagram of a fast signaling example of communications between a peripheral device and a central device in accordance with various examples.

FIG. 7 is a timing diagram 700 of communications between a peripheral device 102 and a central device 104 in accordance with examples of this description. The timing diagram 700 is a fast signaling example, in which the peripheral device 102 provides the indication of the anchor point time to the central device 104 using a fast signaling procedure or protocol. The timing diagram 700 is an example of the peripheral device 102 influencing the placement of an anchor point with a central device 104 during a connection establishment procedure/exchange, although before a connection is established.

In the timing diagram 700, at time 702, the central device 104 initiates a connection (e.g., by sending a connection request to the peripheral device 102). The connection establishment procedure/exchange beings at time 704. In this example, at time 706, the central device 104 sends to the peripheral device 102 an anchor point request that includes a proposed anchor point time. In other examples, the connection request sent by the central device 104 includes a proposed anchor point time (e.g., the anchor point request at time 706 is part of the connection request sent by the central device 104 to the peripheral device 102).

Responsive to receiving the anchor point request at time 706, the peripheral device 102 is configured to determine whether the proposed anchor point time contained in the anchor point request (or connection request) conflicts with another anchor point that the peripheral device 102 has already established with a different central device 104 (e.g., a central device 104 other than the central device 104 that transmitted the anchor point request at time 706).

Responsive to determining that the proposed anchor point time conflicts with another anchor point, the peripheral device 102 is configured to send a response to the requesting central device 104 (e.g., at time 708) that either rejects or proposes a change to the proposed anchor point time. Subsequently, at time 710, an anchor point negotiation takes place between the central device 104 and the peripheral device 102. In an example, the negotiation includes a repetition of the anchor point request from the central device 104, and a response from the peripheral device 102.

Responsive to determining that the proposed anchor point time (e.g., from the initial request at time 706 or from a subsequent request as part of the negotiation at time 710) does not conflict with another anchor point, the peripheral device 102 is configured to send a response to the requesting central device 104 (e.g., at time 708 or during negotiation at time 710) that accepts the proposed anchor point time.

In the fast signaling example of FIG. 7, the indication of the anchor point time provided by the peripheral device 102 to the central device 104 includes any of the rejection, proposed change to, or acceptance of the proposed anchor point time from the central device 104. This is represented at time 712, in which the indication is provided to the central device 104 by the peripheral device 102.

At time 714, connection establishment procedure/exchange between the central device 104 and the peripheral device 102 is completed. In the fast signaling example, the connection is established using the anchor point that is accepted by the peripheral device 102 during the fast signaling exchange, represented at times 706-712. The peripheral device 102 and the central device 104 can then periodically communicate using the established wireless connection and the anchor point agreed upon during the fast signaling negotiation that occurs during the connection establishment procedure/exchange, although before the connection is established.

Figure 8:
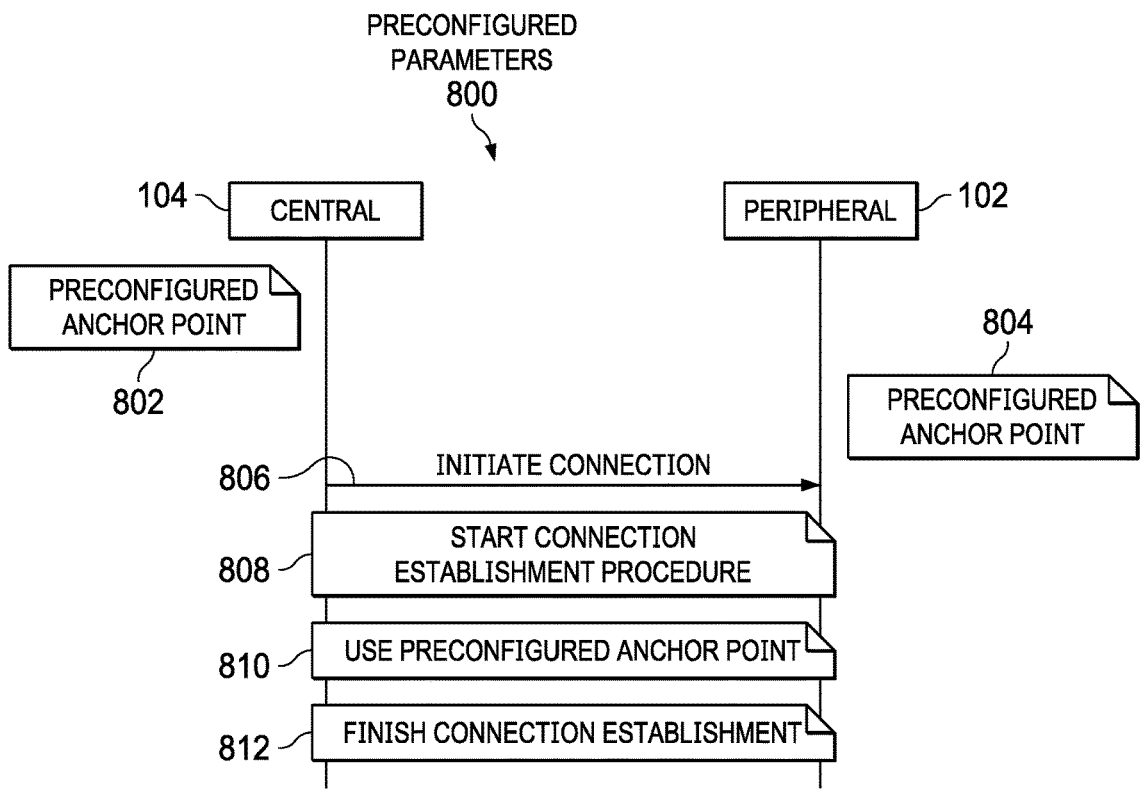
FIG. 8 is a timing diagram of a preconfigured parameters example of communications between a peripheral device and a central device in accordance with various examples.

FIG. 8 is a timing diagram 800 of communications between a peripheral device 102 and a central device 104 in accordance with examples of this description. The timing diagram 800 is a preconfigured parameters example, in which an identifier of the peripheral device 102 provides the indication of the anchor point time to the central device 104. For example, at a time prior to connection establishment between the peripheral device 102 and the central device 104, an anchor point is determined that is unique to the identity of the peripheral device 102 and the central device 104. Both the peripheral device 102 and the central device 104 are aware of this unique anchor point, and thus the anchor point is preconfigured (e.g., before a connection is established) based on the identities of the peripheral device 102 and the central device 104. In an example, the anchor point is "assigned" based on the identities of the peripheral device 102 and the central device 104, and thus the central device 104 avoids requesting or specifying an anchor point in its connection request to the peripheral device 102. In one example, the identifier of a device is its medium access control (MAC) address. The timing diagram 800 is an example of the peripheral device 102 influencing the placement of an anchor point with a central device 104 before a connection establishment procedure/exchange, because it is the identifier of the peripheral device 102 itself that influences the placement of the anchor point.

In the timing diagram 800, times 802 and 804 are before any connection establishment procedure/exchange occurs between the central device 104 and the peripheral device 102. At time 802, the central device 104 is preconfigured with a parameter that indicates an anchor point for use with a device identifier, such as the identifier for the peripheral device 102. In some examples, the central device 104 is preconfigured with parameters that indicate an anchor point for use with each of multiple device identifiers. In one example, the central device 104 is preconfigured with the parameter that indicates the anchor point for use with the peripheral device 102 identifier using a side channel communication with the peripheral device 102. In another example, the central device 104 is preconfigured with the parameter that indicates the anchor point for use with the peripheral device 102 identifier using a connection management app or Application Programming Interface(s) (API(s)) that manage one or more anchor points for use with various device pairs.

Similarly, at time 804, the peripheral device 102 is preconfigured with a parameter that indicates an anchor point for use with a device identifier, such as the identifier for the central device 104. In some examples, the peripheral device 102 is preconfigured with parameters that indicate an anchor point for use with each of multiple device identifiers, such as the multiple central devices 104a-104n described in FIG. 1. In one example, the peripheral device 102 is preconfigured with the parameter that indicates the anchor point for use with the central device 104 identifier using a side channel communication with the central device 104. In another example, the peripheral device 102 is preconfigured with the parameter that indicates the anchor point for use with the central device 104 identifier using a connection management app or APIs that manage one or more anchor points for use with various device pairs.

Referring to the multiple central device example of FIG. 1, for example, each central device 104a-104n is preconfigured with a parameter that indicates a different anchor point for use with the identifier for the peripheral device 102 (e.g., when connecting with the peripheral device 102). In this example, the peripheral device 102 is preconfigured with parameters that indicate a different anchor point for use with each of the identifiers for the central devices 104a-104n (e.g., when connecting with one of the central devices 104a-104n).

In one example, the anchor point for a particular device pair is the same. For example, the central device 104a is preconfigured with a parameter that indicates a first anchor point for use with the identifier for the peripheral device 102. Accordingly, the peripheral device 102 is preconfigured with a parameter that also indicates the first anchor point for use with the identifier for the central device 104a. Continuing this example, the central device 104b is preconfigured with a parameter that indicates a second anchor point for use with the identifier for the peripheral device 102. Accordingly, the peripheral device 102 is preconfigured with a parameter that also indicates the second anchor point for use with the identifier for the central device 104b. The first and second anchor points are preconfigured such that collisions are avoided when multiple central devices (e.g., the central devices 104a and 104b) are establishing connections with the peripheral device 102.

In the timing diagram 800, at time 806, the central device 104 initiates a connection (e.g., by sending a connection request to the peripheral device 102). The connection establishment procedure/exchange beings at time 808. In this example, at time 810, the central device 104 sends to the peripheral device 102 a request that includes the preconfigured anchor point for the peripheral device 102 responsive to receiving the identifier for the peripheral device 102. In some examples, the peripheral device 102 provides its identifier to the central device 104 in a pre-connection broadcast packet (e.g., during the BLE discovery state and/or the BLE connecting state).

At time 812, the connection establishment procedure/exchange between the central device 104 and the peripheral device 102 is completed. In the preconfigured parameters example of FIG. 8, the indication of the anchor point time provided by the peripheral device 102 to the central device 104 is the identifier of the peripheral device 102, which is associated with a particular anchor point in a preconfigured manner as described above. In the preconfigured parameters example, the connection is established using the preconfigured anchor point for the identifier of the peripheral device 102. The peripheral device 102 and the central device 104 can then periodically communicate using the established wireless connection and the preconfigured anchor point for the identifier of the peripheral device 102. The indication of the anchor point time, or the identifier of the peripheral device 102, is provided before the connection is established.

Figure 9:
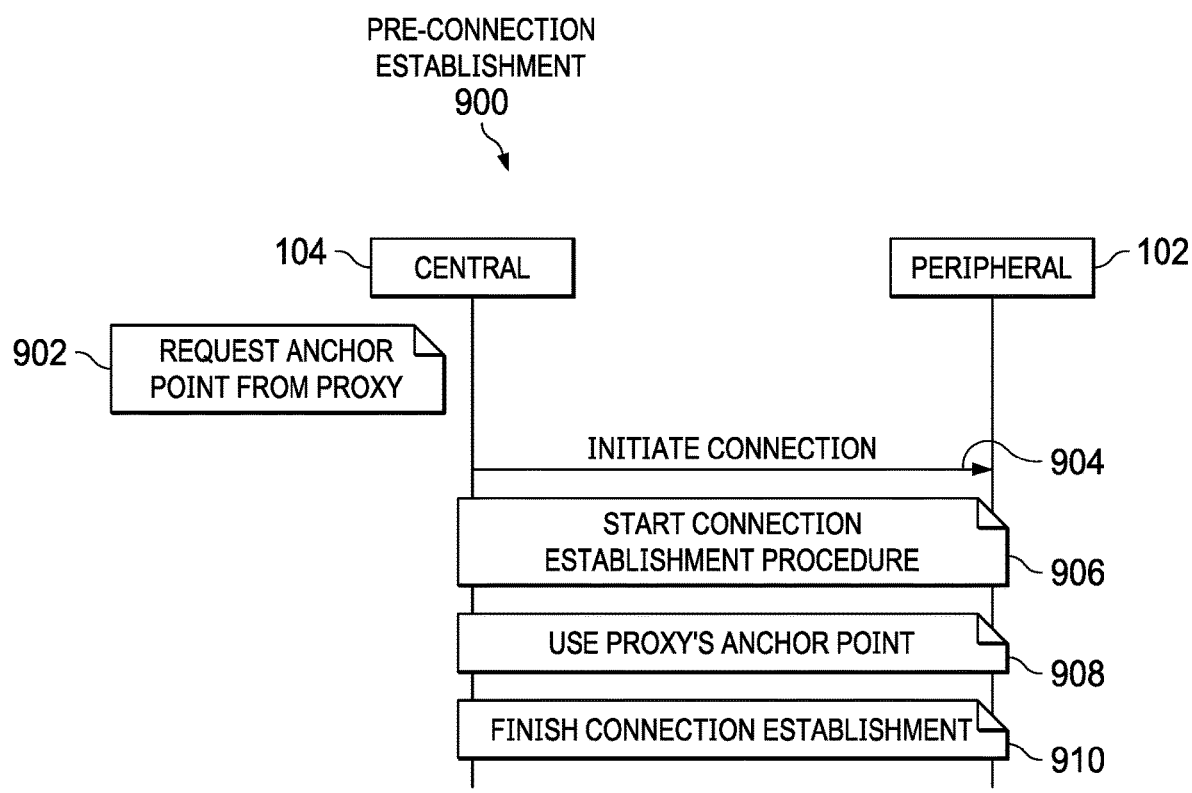
FIG. 9 is a timing diagram of a pre-connection establishment example of communications between a peripheral device and a central device in accordance with various examples.

FIG. 9 is a timing diagram 900 of communications between a peripheral device 102 and a central device 104 in accordance with examples of this description. The timing diagram 900 is a pre-connection establishment with a proxy device example (e.g., a proxy example), in which a proxy device other than the peripheral device 102 and the central device 104 maintains a list of anchor points for one or more peripheral devices 102-central devices 104 device pairs. In one example, the proxy device is a server (e.g., maintaining a proxy app) that is accessible by the peripheral device 102 and the central device 104. In another example, the proxy device is an already-connected central device 104 (e.g., a central device 104 other than the central device 104 seeking to establish a connection with the peripheral device 102).

In the proxy example, at a time prior to connection establishment between the peripheral device 102 and the central device 104, the peripheral device 102 determines that the particular central device 104 is a device that may establish a connection with the peripheral device 102 in the future. Accordingly, the peripheral device 102 provides the indication of the anchor point time for the particular central device 104 to a proxy device, which maintains a list of anchor points for each of one or more peripheral devices 102-central devices 104 device pairs. As one example, in the vehicular access application described above, the proxy device maintains a list of anchor points for each of the central devices 104 (e.g., smartphones) that are members of the access group for the peripheral device 102 (e.g., vehicle).

The timing diagram 900 is an example of the peripheral device 102 influencing the placement of an anchor point with a central device 104 before a connection establishment procedure/exchange. For example, the peripheral device 102 specifies an anchor point for a particular central device 104 (e.g., an authenticated device that is a member of the access group in the vehicular access application) to the proxy device, which is subsequently queried by the central device 104 to determine the placement of the anchor point for a connection between that central device 104 and the peripheral device 102.

In the timing diagram 900, time 902 is before any connection establishment procedure/exchange occurs between the central device 104 and the peripheral device 102. At time 902, the central device 104 queries the proxy device to determine an anchor point time to be used when connecting with the peripheral device 102. As described above, the peripheral device 102 has previously provided the proxy device with an indication of this anchor point time (e.g., when determining to add the central device 104 to the access group of authenticated devices). In some examples, the proxy device list includes anchor points for each of multiple central devices 104a-104n to connect with the peripheral device 102.

Referring to the multiple central device example of FIG. 1, for example, the proxy device maintains a list of anchor points for each central device 104a-104n to use when connecting with the peripheral device 102. In this example, the peripheral device 102 is preconfigured with parameters that indicate a different anchor point for use with each of the identifiers for the central devices 104a-104n (e.g., when connecting with one of the central devices 104a-104n).

For example, the peripheral device 102 provides the proxy device with an indication of a first anchor point time to influence placement of a first anchor point with the central device 104a. Similarly, the peripheral device provides the proxy device with an indication of a second anchor point time to influence placement of a second anchor point with the central device 104b. In some examples, the peripheral device 102 provides the proxy device with the indication of an anchor point time for a particular central device 104 responsive to determining to add that particular central device 104 to the access group of authenticated devices. The indications of the first and second anchor points are such that collisions are avoided when multiple central devices (e.g., the central devices 104a and 104b) are establishing connections with the peripheral device 102.

In the timing diagram 900, at time 904, the central device 104 initiates a connection (e.g., by sending a connection request to the peripheral device 102). The connection establishment procedure/exchange beings at time 906. In this example, at time 908, the central device 104 sends to the peripheral device 102 a request that includes the anchor point for the peripheral device 102 that the central device 104 queried from the proxy device.

At time 910, the connection establishment procedure/exchange between the central device 104 and the peripheral device 102 is completed. In the proxy example of FIG. 9, the peripheral device 102 provides the proxy device with the indication of the anchor point time for a particular central device 104, which is queried by the central device 104 before establishing a connection with the peripheral device 102. In the proxy example, the connection is established using the anchor point stored by the proxy device that corresponds to the connecting central device 104. The peripheral device 102 and the central device 104 can then periodically communicate using the established wireless connection and the anchor point from the proxy device, which is provided by the peripheral device 102 before the connection is established.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

What is claimed is:

1. A method, comprising:
   receiving, by a peripheral device, a first connection request from a first central device;
   providing, by the peripheral device, a first indication of an anchor point time to the first central device before establishing a first wireless connection with the first central device; and
   responding, by the peripheral device, to the first connection request and establishing the first wireless connection using a first anchor point based on the first indication.

2. The method of claim 1, wherein the first indication comprises an available time for the first anchor point.

3. The method of claim 1, wherein the first indication comprises an unavailable time for the first anchor point.

4. The method of claim 1, further comprising periodically communicating, by the peripheral device, with the first central device responsive to the first anchor point and using the first wireless connection.

5. The method of claim 4, further comprising:
   receiving, by the peripheral device, a second connection request from a second central device;
   providing, by the peripheral device, a second indication of a second anchor point to the second central device before establishing a second wireless connection with the second central device;
   responding, by the peripheral device, to the second connection request and establishing the second wireless connection using the second anchor point; and
   periodically communicating, by the peripheral device, with the second central device responsive to the second anchor point and using the second wireless connection.

6. The method of claim 1, wherein:
   providing the first indication further comprises broadcasting, by the peripheral device, an advertisement packet including the first indication prior to receiving the first connection request;
   the first connection request specifies the first anchor point based on the first indication; and
   the method further comprises communicating, by the peripheral device, with the first central device responsive to the first anchor point and using the first wireless connection.

7. The method of claim 1, wherein the first connection request includes a proposed anchor point time, the method further comprising:
   responsive to determining, by the peripheral device, that the proposed anchor point time conflicts with another anchor point, sending, by the peripheral device, a response to the first central device including the first indication, wherein the first anchor point is for a time different than the proposed anchor point time; and responsive to determining, by the peripheral device, that the proposed anchor point time does not conflict with another anchor point, sending, by the peripheral device, a response to the first central device including the first indication accepting the proposed anchor point time, wherein the first anchor point is for the proposed anchor point time.

8. The method of claim 1, wherein:

the first indication comprises an identifier of the peripheral device;

the first connection request specifies a preconfigured anchor point time responsive to the identifier for the peripheral device as the first anchor point; and the method further comprises communicating, by the peripheral device, with the first central device responsive to the first anchor point and using the first wireless connection.

9. The method of claim 1, further comprising:

providing, by the peripheral device, the first indication to a proxy device; and querying, by the first central device, the proxy device for the anchor point time specified by the first indication;

wherein the first connection request specifies the anchor point time from the proxy device as the first anchor point; and wherein the method further comprises communicating, by the peripheral device, with the first central device responsive to the first anchor point and using the first wireless connection.

10. The method of claim 1, wherein the first wireless connection comprises a Bluetooth Low Energy (BLE) connection.

11. The method of claim 1, wherein, before receiving the first connection request from the first central device, the peripheral device has an established second wireless connection with a second central device.

12. The method of claim 1, wherein providing the first indication of the anchor point time is performed after the first connection request is received and before the first wireless connection is established.

13. A device, comprising:

a wireless transceiver;

a processor coupled to the wireless transceiver; and a memory coupled to the processor, the memory storing instructions that, when executed by the processor, cause the device to be configured to:

receive a first connection request from a first central device;

provide a first indication of an anchor point time to the first central device before establishing a first wireless connection with the first central device; and respond to the first connection request and establish the first wireless connection using a first anchor point based on the first indication.

14. The device of claim 13, wherein:

providing the first indication further comprises broadcasting an advertisement packet including the first indication prior to receiving the first connection request;

the first connection request specifies the first anchor point based on the first indication; and the instructions, when executed by the processor, further cause the device to be configured to communicate with the first central device responsive to the first anchor point and using the first wireless connection.

15. The device of claim 13, wherein the first connection request includes a proposed anchor point time, and the instructions, when executed by the processor, further cause the device to be configured to:

responsive to determining that the proposed anchor point time conflicts with another anchor point, send a response to the first central device including the first indication, wherein the first anchor point is for a time different than the proposed anchor point time; and responsive to determining that the proposed anchor point time does not conflict with another anchor point, send a response to the first central device including the first indication accepting the proposed anchor point time, wherein the first anchor point is for the proposed anchor point time.

16. The device of claim 13, wherein:

the first indication comprises an identifier of the device;

the first connection request specifies a preconfigured anchor point time responsive to the identifier for the device as the first anchor point; and the instructions, when executed by the processor, further cause the device to be configured to communicate with the first central device responsive to the first anchor point and using the first wireless connection.

17. The device of claim 13, wherein the instructions, when executed by the processor, further cause the device to be configured to provide the first indication to a proxy device, wherein:

the first central device is configured to query the proxy device for the anchor point time specified by the first indication;

the first connection request specifies the anchor point time from the proxy device as the first anchor point; and the instructions, when executed by the processor, further cause the device to be configured to communicate with the first central device responsive to the first anchor point and using the first wireless connection.

18. A system, comprising:

a first device configured as a Bluetooth Low Energy (BLE) peripheral; and a second device configured as a BLE central;

wherein the first device is configured to:

receive a first connection request from the second device;

provide a first indication of an anchor point time to the second device before establishing a first wireless connection with the second device; and respond to the first connection request and establish the first wireless connection using a first anchor point based on the first indication.

19. The system of claim 18, wherein:

providing the first indication further comprises broadcasting an advertisement packet including the first indication prior to receiving the first connection request;

the first connection request specifies the first anchor point based on the first indication; and the first device is further configured to communicate with the second device responsive to the first anchor point and using the first wireless connection.

20. The system of claim 18, wherein the first connection request includes a proposed anchor point time, and the first device is further configured to:

responsive to determining that the proposed anchor point time conflicts with another anchor point, send a response to the second device including the first indication, wherein the first anchor point is for a time different than the proposed anchor point time; and responsive to determining that the proposed anchor point time does not conflict with another anchor point, send a response to the second device including the first indication accepting the proposed anchor point time, wherein the first anchor point is for the proposed anchor point time.

21. The system of claim 18, wherein:

the first indication comprises an identifier of the first device;

the first connection request specifies a preconfigured anchor point time responsive to the identifier for the first device as the first anchor point; and the first device is further configured to communicate with the second device responsive to the first anchor point and using the first wireless connection.

22. The system of claim 18, wherein the first device is further configured to provide the first indication to a proxy device, wherein:

the second device is configured to query the proxy device for the anchor point time specified by the first indication;

the first connection request specifies the anchor point time from the proxy device as the first anchor point; and the first device to be configured to communicate with the second device responsive to the first anchor point and using the first wireless connection.

* * * * *